United States Patent
Yoda

(10) Patent No.: US 8,254,712 B2
(45) Date of Patent: Aug. 28, 2012

(54) IMAGE PROCESSING APPARATUS, IMAGE PROCESSING METHOD, IMAGE MANAGING APPARATUS, IMAGE MANAGING METHOD, COMPUTER PROGRAM PRODUCT, AND IMAGE ORDER SHEET

(75) Inventor: Akira Yoda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1160 days.

(21) Appl. No.: 12/056,844

(22) Filed: Mar. 27, 2008

(65) Prior Publication Data

US 2008/0240493 A1 Oct. 2, 2008

(30) Foreign Application Priority Data

Mar. 30, 2007 (JP) .................................. 2007-092482
Dec. 7, 2007 (JP) .................................. 2007-317626

(51) Int. Cl.
*G06K 9/40* (2006.01)

(52) U.S. Cl. ........ 382/255; 382/274; 382/276; 382/289; 359/319; 356/124.5

(58) Field of Classification Search .......... 384/254–275; 382/255, 274, 276, 289; 359/319; 356/124.5
See application file for complete search history.

(56) References Cited

U.S. PATENT DOCUMENTS

| 5,748,371 A | 5/1998 | Cathey, Jr. et al. | |
| 2005/0047672 A1* | 3/2005 | Ben-Ezra et al. | 382/255 |

FOREIGN PATENT DOCUMENTS

| JP | 2000137788 A | 5/2000 |
| JP | 2001-215626 | 8/2001 |
| JP | 2002-513951 A | 5/2002 |
| JP | 2003-199708 A | 7/2003 |
| JP | 2004-045693 A | 2/2004 |
| JP | 2004-061961 A | 2/2004 |
| JP | 2005222152 A | 8/2005 |
| JP | 200774143 A | 3/2007 |

OTHER PUBLICATIONS

Japanese Office Action for 2007-317626; dated Jul. 26, 2011.
Japanese Office Action dated Jan. 17, 2012 issued in a corresponding Japanese Patent Application No. 2007-317626.

* cited by examiner

*Primary Examiner* — Wesley Tucker
*Assistant Examiner* — Mark Roz
(74) *Attorney, Agent, or Firm* — Sughrue Mion, PLLC

(57) ABSTRACT

An image processing apparatus is provided that can quickly provide an image in which a main portion has a high image quality. The image processing apparatus includes an original image acquiring section that acquires an original image; a characteristic region judging section that makes a judgment as to whether a characteristic region is present in the original image captured by the original image acquiring section; an image adjusting section that, in a case where the characteristic region judging section makes a judgment that the characteristic region is present, adjusts an image of the characteristic region in the original image acquired by the original image acquiring section based on optical characteristics of an image capturing apparatus that captured the original image; and an image output section that, in a case where the characteristic region judging section makes a judgment that the characteristic region is present, outputs an image obtained through the adjustment by the image adjusting section and, in a case where the characteristic region judging section makes a judgment that the characteristic region is not present, outputs the original image acquired by the original image acquiring section.

9 Claims, 12 Drawing Sheets

IMAGE PROCESSING APPARATUS, IMAGE PROCESSING METHOD, IMAGE MANAGING APPARATUS, IMAGE MANAGING METHOD, COMPUTER PROGRAM PRODUCT, AND IMAGE ORDER SHEET

The present patent application claims priority based on Japanese Patent Applications No. 2007-092482 filed on Mar. 30, 2007 and No. 2007-317626 filed on Dec. 7, 2007, the contents of which are incorporated herein by reference.

BACKGROUND

1. Technical Field

The present invention relates to an image processing apparatus, an image processing method, an image managing apparatus, an image managing method, a computer program product, and an image order sheet. More particularly, the present invention relates to an image processing apparatus and an image processing method for processing an image, an image managing apparatus and an image managing method for managing an image, a computer program product used by the image processing apparatus and the image managing apparatus, and an image order sheet by which a customer can order an image.

2. Related Art

A print order receiving apparatus that can read image data of a customer and into which information for creating a print based on the read image data can be input, in which the image based on the image data is displayed in an image frame section, any portion of the image displayed in the image frame section is enlarged and displayed on an enlarged image frame section, and a box that displays which portion of the image displayed in the image frame section corresponds to the arbitrary enlarged display portion is displayed in the display frame section, is known as in, for example, Japanese Patent Application Publication No. 2001-215626. Furthermore, a phase mask that holds an optical transfer function substantially constant within a certain range from a focal point position is known as in, for example, U.S. Pat. No. 5,748,371 Specification.

When the customer orders a print, it is desirable that the customer be able to determine before ordering whether the image can be printed cleanly. For example, it is not good to print an image in which red-eye occurs, an image in which the contrast is not expressed well, or the like, but in index prints used to select an image to print from many thumbnail images, there are instances where the customer cannot easily see whether red-eye is present or whether the contrast is expressed well because the index image is small. Because of this, it is desirable that at least the important regions of the image have high image quality. Furthermore, according to the technology recorded in U.S. Pat. No. 5,748,371 Specification, an image that is in focus over a wide range can be obtained by reproducing the blur of a blurred image obtained by using a phase mask to capture an image and widen the focal depth. However, because the reproduction process takes time and requires an extremely large amount of computational power, performing the reproduction process in each individual image capturing apparatus is not practical. Furthermore, an artifact occurs more easily when the reproduction process is applied and it is necessary to apply an appropriate correction process depending on the subject, but there are cases where the customer cannot judge whether the reproduction process would be appropriate based on the thumbnail images in the index prints.

SUMMARY

Therefore, it is an object of an aspect of the innovations herein to provide an image processing apparatus, an image processing method, an image managing apparatus, an image managing method, a computer program product, and an image order sheet, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary apparatus may include an image processing apparatus, including an original image acquiring section that acquires an original image; a characteristic region judging section that makes a judgment as to whether a characteristic region is present in the original image captured by the original image acquiring section; an image adjusting section that, in a case where the characteristic region judging section makes a judgment that the characteristic region is present, adjusts an image of the characteristic region in the original image acquired by the original image acquiring section based on optical characteristics of an image capturing apparatus that captured the original image; and an image output section that, in a case where the characteristic region judging section makes a judgment that the characteristic region is present, outputs an image obtained through the adjustment by the image adjusting section and, in a case where the characteristic region judging section makes a judgment that the characteristic region is not present, outputs the original image acquired by the original image acquiring section.

According to a second aspect related to the innovations herein, one exemplary method may include an image processing method that includes acquiring an original image, making a judgment as to whether a characteristic region is present in the original image acquired at the original image acquiring step, adjusting an image of the characteristic region in the original image acquired at the original image acquiring step based on optical characteristics of an image capturing apparatus that captured the original image when a judgment is made at the characteristic region judging step that the characteristic region is present, and outputting an image obtained through the adjustment at the image adjusting step in a case where a judgment is made at the characteristic region judging step that the characteristic region is present and outputting the original image acquired at the original image acquiring step in a case where a judgment is made at the characteristic region judging step that the characteristic region is not present.

According to a third aspect related to the innovations herein, one exemplary program may include a computer program product used by an image processing apparatus, having computer instructions, recorded on a computer readable medium, for enabling a computer executing the computer instructions to cause the image processing apparatus to function as an original image acquiring section that acquires an original image; a characteristic region judging section that makes a judgment as to whether a characteristic region is present in the original image captured by the original image acquiring section; an image adjusting section that, in a case where the characteristic region judging section makes a judgment that the characteristic region is present, adjusts an image of the characteristic region in the original image acquired by the original image acquiring section based on optical characteristics of an image capturing apparatus that captured the original image; and an image output section that, in a case where the characteristic region judging section makes a judgment that the characteristic region is present, outputs an image obtained through the adjustment by the image adjusting section and, in a case where the characteristic region judging section makes a judgment that the characteristic region is not present, outputs the original image acquired by the original image acquiring section.

According to a fourth aspect related to the innovations herein, one exemplary apparatus may include an image managing apparatus that includes an original image acquiring section that acquires an original image and associated information that indicates optical characteristics of an image capturing apparatus that captured the original image, a small data amount image generating section that generates a small data amount image obtained by reducing a data amount of the original image acquired by the original image acquiring section, an image adjusting section that adjusts the image captured by the original image acquiring section based on the optical characteristics indicated by the information acquired by the original image acquiring section in association with the original image, a characteristic portion detecting section that detects a characteristic portion in the image obtained through the adjustment by the image adjusting section, a partial image extracting section that extracts a partial image that includes the characteristic portion in the image obtained through the adjustment by the image adjusting section, a partial image enlarging section that enlarges the partial image extracted by the partial image extracting section, and an image output section that outputs the partial image enlarged by the partial image enlarging section along with the small data amount image generated by the small data amount image generating section.

In the image managing apparatus, the small data amount image generating section may include a thumbnail image generating section that generates a thumbnail image obtained by decreasing a data amount of the original image acquired by the original image acquiring section, and the image output section may output the partial image enlarged by the partial image enlarging section along with the thumbnail image generated by the thumbnail image generating section. The image managing apparatus may further include an extraction condition storage section that stores in advance therein an extraction condition for a partial image to be extracted by the partial image extracting section. In the image managing apparatus, the characteristic portion detecting section may extract a portion of that matches the extraction condition stored in the extraction condition storage section from the original image acquired by the original image acquiring section.

In the image managing apparatus, the original image acquiring section may acquire the plurality of original images and associated information that indicates optical characteristics of each image capturing apparatus that captured each of the plurality of original images, the thumbnail image generating section may generate a thumbnail of each of the plurality of original images acquired by the original image acquiring section, the image adjusting section may adjust each of the plurality of original images captured by the original image acquiring section based on the optical characteristics indicated by the information acquired by the original image acquiring section in association with each of the plurality of original images, the characteristic portion detecting section may detect a characteristic portion in each of the plurality of original images obtained through the adjustment of each of the plurality of original images by the image adjusting section, the partial image extracting section may extract a partial image that includes the characteristic portion in each of the plurality of original images obtained through the adjustment of each of the plurality of original images by the image adjusting section, the partial image enlarging section may enlarge the plurality of partial images extracted by the partial image extracting section, and the image output section may output each of the plurality of partial images enlarged by the partial image enlarging section along with each of the plurality of the thumbnail images generated by the thumbnail image generating section.

The image managing apparatus may further include a print order receiving section that receives an order for printing of the original images corresponding to the plurality of thumbnail images output by the image output section. In the image managing apparatus, the image output section may display an order sheet in which each of the plurality of partial images enlarged by the partial image enlarging section is displayed in a vicinity of each of the plurality of thumbnail images generated by the thumbnail image generating section.

In the image managing apparatus, the image output section may print an order sheet in which each of the plurality of partial images enlarged by the partial image enlarging section is printed in a vicinity of each of the plurality of thumbnail images generated by the thumbnail image generating section. Alternatively, in the image managing apparatus, the image output section may record each of the plurality of thumbnail images generated by the thumbnail image generating section and each of the plurality of partial images enlarged by the partial image enlarging section to be output in association with each other by outputting the partial images and the thumbnail images to the recording medium to be recorded therein.

In the image managing apparatus, the characteristic portion detecting section may detect a main subject in the image obtained through the adjustment by the image adjusting section and the partial image extracting section may extract the partial image that includes the main subject in the image obtained through the adjustment by the image adjusting section. For example, the characteristic portion detecting section may detect a person in the image obtained through the adjustment by the image adjusting section and the partial image extracting section may extract the partial image that includes the person in the image obtained through the adjustment by the image adjusting section. Alternatively, the characteristic portion detecting section may detect a face of a person in the image obtained through the adjustment by the image adjusting section and the partial image extracting section may extract the partial image that includes the face of the person in the image obtained through the adjustment by the image adjusting section. As another example, the characteristic portion detecting section may detect an eye of a person in the image obtained through the adjustment by the image adjusting section and the partial image extracting section may extract the partial image that includes the eye of the person in the image obtained through the adjustment by the image adjusting section.

The image managing apparatus may further include a brightness distribution calculating section that calculates a brightness distribution in the image obtained through the adjustment by the image adjusting section. In the image managing apparatus, the characteristic portion detecting section may detect a portion in which a density of pixels having a minimum brightness or pixels having a maximum brightness is high in the image obtained through the adjustment by the image adjusting section based on a calculation result from the brightness distribution calculating section, and the partial image extracting section may extract the partial image of the portion in which the density of the pixels having the minimum brightness or the pixels having the maximum brightness is high in the image obtained through the adjustment by the image adjusting section.

In the image managing apparatus, the original image acquiring section may acquire the original image captured by the image capturing apparatus that includes an optical system that holds an optical transfer function substantially constant over a predetermined object distance range on an optical axis, in association with information that indicates the optical features, and the image adjusting section may adjust the original image acquired by the original image acquiring section based on the optical transfer function indicated by the information acquired by the original image acquiring section.

According to a fifth aspect related to the innovations herein, one exemplary method may include an image managing method. The image managing method includes acquiring an original image and associated information that indicates optical characteristics of an image capturing apparatus that captured the original image, generating a thumbnail image of the original image acquired at the original image acquiring step, adjusting the image acquired at the original image acquiring step based on the optical characteristics indicated by the information acquired at the original image acquiring step in association with the original image, detecting a characteristic portion in the image obtained through the adjustment at the image adjusting step, extracting a partial image that includes the characteristic portion in the image obtained through the adjustment at the image adjusting step, enlarging the partial image extracted at the partial image extracting step, and outputting the partial image enlarged at the partial image enlarging step along with the thumbnail image generated at the thumbnail image generating step.

According to a sixth aspect related to the innovations herein, one exemplary program may include a computer program product used by an image managing apparatus, having computer instructions, recorded on a computer readable medium, for enabling a computer executing the computer instructions to cause the image managing apparatus to function as an original image acquiring section that acquires an original image and associated information that indicates optical characteristics of an image capturing apparatus that captured the original image, a thumbnail image generating section that generates a thumbnail image of the original image acquired by the original image acquiring section, an image adjusting section that adjusts the image captured by the original image acquiring section based on the optical characteristics indicated by the information acquired by the original image acquiring section in association with the original image, a characteristic portion detecting section that detects a characteristic portion in the image obtained through the adjustment by the image adjusting section, a partial image extracting section that extracts a partial image that includes the characteristic portion in the image obtained through the adjustment by the image adjusting section, a partial image enlarging section that enlarges the partial image extracted by the partial image extracting section, and an image output section that outputs the partial image enlarged by the partial image enlarging section along with the thumbnail image generated by the thumbnail image generating section.

According to a seventh aspect related to the innovations herein, one exemplary sheet may include an image order sheet that includes an entire image printing section in which an entire original image is printed, a partial image printing section in which is printed an image obtained by enlarging a partial image that includes a characteristic portion in an image obtained through adjustment of the original image based on optical characteristics of an image capturing apparatus that captured the original image, and an entire image order entry section into which an order for the original image is entered.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

According to the present invention, a user can use the image managing apparatus to easily check the quality of an image of an important portion that is difficult to see properly from a thumbnail image.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
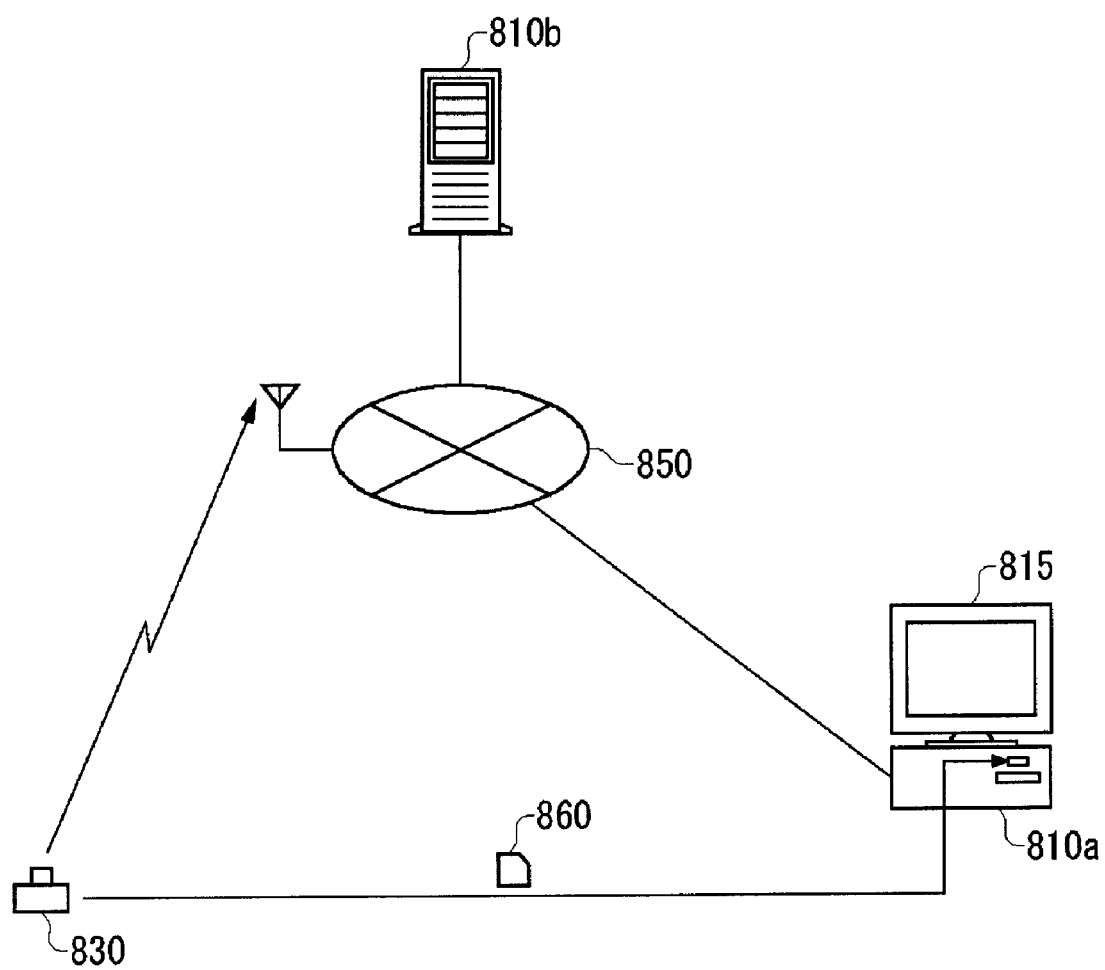
FIG. 1 shows an example of an environment in which to use an image processing system 800 according to an embodiment of the present invention.

FIG. 1 shows an example of an environment in which to use an image processing system 800 according to an embodiment of the present invention. The image processing system 800 is provided with an image capturing apparatus 830, an image display apparatus 815, an image processing apparatus 810$a$, and an image processing apparatus 810$b$ (hereinafter referred to collectively as "the image processing apparatuses 810"). The image processing apparatuses 810 acquire a captured image captured by the image capturing apparatus 830 via a communication line 850 and a recording medium 860.

The image processing apparatuses 810 detect a characteristic region such as a face of a person, an eye of a person, or the like included in the captured image acquired from the image capturing apparatus 830. When a characteristic region is detected, the image processing apparatuses 810 reproduce only the image of the characteristic region based on optical characteristics of an optical system of the image capturing apparatus 830 and supply the reproduced image to the image display apparatus 815. On the other hand, when a characteristic region is not detected, the image processing apparatuses 810 supply the captured image to the image display apparatus 815. Here, the image processing apparatus 810a may be an information processing apparatus such as a personal computer or the like, for example. The image display apparatus 815 connected to the image processing apparatus 810a may display a reproduced image that is a reproduction by the image processing apparatus 810a of the image of the characteristic region. The image processing apparatus 810b may be an image processing server that receives the image from the image capturing apparatus 830, processes the image, and provides the reproduced image to the image display apparatus 815 via the communication line 850.

The image capturing apparatus 830, as described hereinafter, includes an optical system that evenly blurs light from a subject and captures an image of the subject via the optical system. Accordingly, a blurred subject image is included in the captured image produced by the image capturing apparatus 830. The image capturing apparatus 830 may record the captured image on the recording medium 860 and provide the captured image to the image processing apparatus 810a via the recording medium 860. Alternatively, the image capturing apparatus 830 may supply the captured image to the image processing apparatuses 810 via the communication line 850. Here, the image capturing apparatus 830 transmits information concerning optical characteristics of the optical system to the image processing apparatuses 810 by recording the optical characteristics of the optical system onto the recording medium 860, including the optical characteristics of the optical system in the captured image, or the like. Furthermore, the image capturing apparatus 830 may transmit a machine ID that can identify the image capturing apparatus 830 to the image processing apparatus 810 by recording the machine ID onto the recording medium 860, including the machine ID in the captured image, or the like. In such a case, the image processing apparatus 810 may acquire the optical characteristics corresponding to the machine ID from the transmitted machine ID.

By using the image processing system 800 described above, a reproduced image can be generated more quickly than in a case where the reproduction process is applied to the entire image because the reproduction process is applied only to the characteristic region of the captured image. Because the reproduced image output from the image processing apparatus 810 includes a characteristic region having high image quality, the subject can easily be identified from the image content of the reproduced region. Furthermore, a characteristic region can be enhanced from the region that is not reproduced. Here, a digital camera, a microscope, an endoscope, or the like are given as examples of the image capturing apparatus 830.

Figure 2:
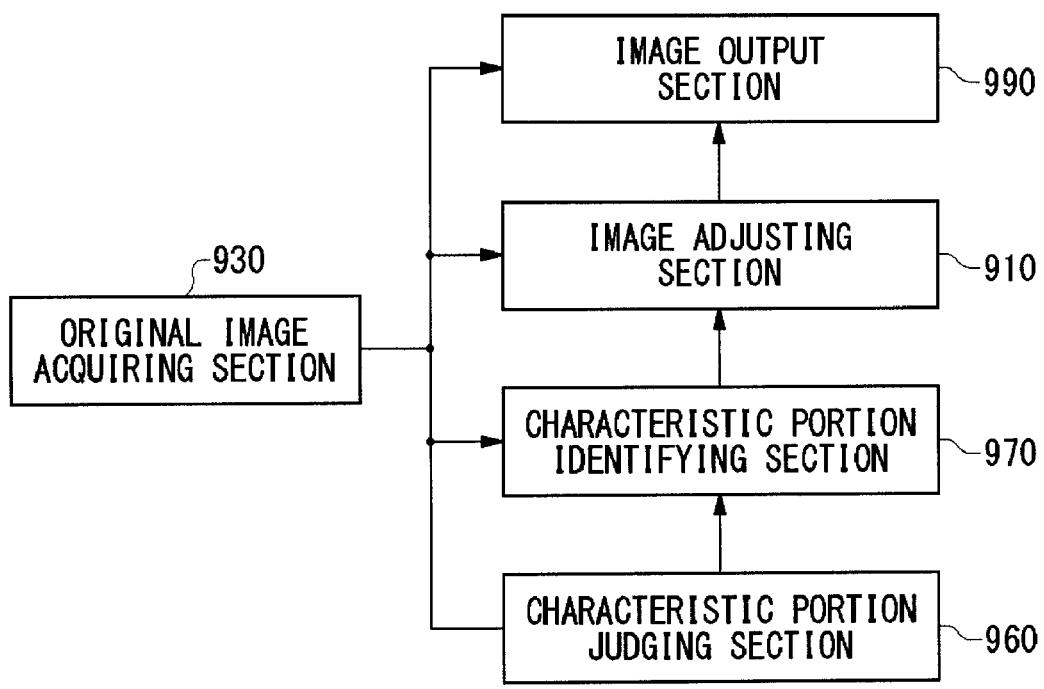
FIG. 2 shows an exemplary block configuration of an image processing apparatus 810.

FIG. 2 is an exemplary block configuration of the image processing apparatus 810. The image processing apparatus 810 includes an original image acquiring section 930, a characteristic region judging section 960, a characteristic region identifying section 970, an image adjusting section 910, and an image output section 990. The original image acquiring section 930 acquires an original image. A captured image generated by capturing an image of the subject is given as an example of the original image. For example, the original image acquiring section 930 acquires the captured image captured by the image capturing apparatus 830. The characteristic region judging section 960 makes a judgment as to whether a characteristic region exists in the original image acquired by the original image acquiring section 930.

In a case where the characteristic region judging section 960 makes a judgment that a characteristic region is present, the characteristic region identifying section 970 identifies the characteristic region in the original image. In a case where the characteristic region judging section 960 makes a judgment that a characteristic region is present, the image adjusting section 910 adjusts the image of the characteristic region in the original image acquired by the original image acquiring section 930 based on the optical characteristics of the image capturing apparatus 830 that captured the original image. In a case where the characteristic region judging section 960 makes a judgment that a characteristic region is present, the image output section 990 outputs the image obtained through the adjustment by the image adjusting section 910, and in a case where the characteristic region judging section 960 makes a judgment that a characteristic region is not present, the image output section 990 outputs the original image acquired by the original image acquiring section 930.

As described hereinafter, the image capturing apparatus 830 includes an optical system in which an optical transfer function in relation to light from an object is substantially constant over a range of a predetermined object distance along the optical axis. In such a case, when the characteristic region judging section 960 makes a judgment that a characteristic region is present, the image adjusting section 910 adjusts the image of the characteristic region in the original image acquired by the original image acquiring section 930 based on the optical transfer function of the optical system of the image capturing apparatus 830. More specifically, the image adjusting section 910 reproduces the image of the characteristic region in the original image by applying reverse filtering to the optical response indicated by the optical transfer function of the optical system of the image capturing apparatus 830 to the image of the characteristic region in the original image.

The original image acquiring section 930 may acquire a plurality of original images included in a motion image captured by the image capturing apparatus 830. In such a case, frame images or field images can be given as examples of the original images. Furthermore, in such a case, the characteristic region judging section 960 makes a judgment as to whether a characteristic region is present in each of the plurality of original images. The image adjusting section 910 adjusts the images of the characteristic regions in the original images in which the characteristic region is judged to be present by the characteristic region judging section 960, based on the optical transfer function of the optical system of the image capturing apparatus 830. The image output section 990 outputs the image obtained through the adjustment by the image adjusting section 910 of the original image in which the judgment is made by the characteristic region judging section 960 that the characteristic region is present and also outputs the original image in which the judgment is made by the characteristic region judging section 960 that the characteristic region is not present.

The characteristic region judging section 960 makes a judgment as to whether a characteristic region is present in each of the plurality of original images in the motion image based on a motion vector included in the motion image. For example, the characteristic region judging section 960 makes a judgment as to whether a moving object is present in each of the plurality of original images in the motion image based on a motion vector included in the motion image.

For example, the characteristic region judging section 960 identifies macroblocks in which the motion vectors are substantially the same. For example, the characteristic region judging section 960 identifies as a macroblock in which the motion vectors are substantially the same, a macroblock that includes motion vectors between which a difference in direction of the motion vectors is less than a predetermined value and a difference in size of the motion vectors is less than a predetermined value. In a case where a region exists in which a density of macroblocks that include substantially identical motion vectors is greater than a prescribed value, the characteristic region judging section 960 makes a judgment that a moving object is present.

When the characteristic region judging section 960 makes the judgment that the moving object is present, the image adjusting section 910 adjusts the image of the region in which the moving object is present in the original image in which the moving object was judged to be present by the characteristic region judging section 960 based on the optical transfer function of the optical system of the image capturing apparatus 830.

Alternatively, the characteristic region judging section 960 may make a judgment as to whether a region that changes over time is present in each of the plurality of original images based on the motion vectors included in the motion image. For example, the characteristic region judging section 960 makes a judgment as to whether a region in which an amount of change over time of a motion vector is greater than a predetermined value is present. In a case where the characteristic region judging section 960 makes a judgment that a region changing over time is present, the image adjusting section 910 adjusts the image of the aforementioned region based on the optical transfer function of the optical system of the image capturing apparatus 830.

As another example, the characteristic region judging section 960 may make a judgment as to whether a characteristic region is present in each of the plurality of original images based on a color included in the plurality of original images. For example, the characteristic region judging section 960 makes a judgment as to whether a region in which a number of pixels of a certain color included in a predetermined color region is greater than or equal to a predetermined value is present in the original images.

Figure 3:
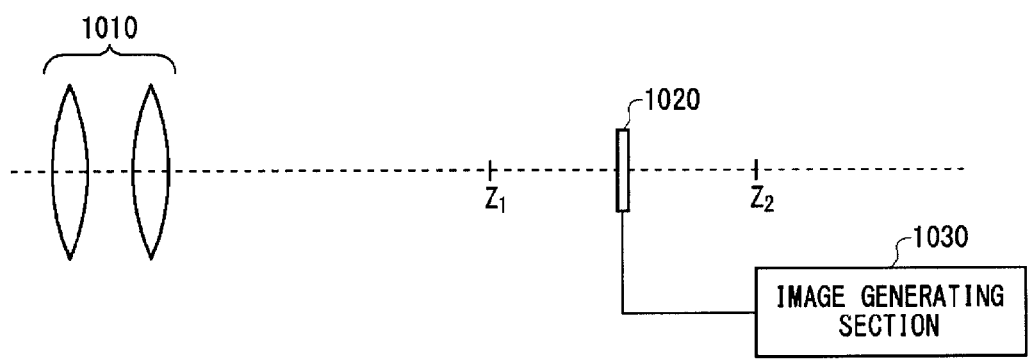
FIG. 3 shows an exemplary block configuration of an image capturing apparatus 830.

FIG. 3 shows an exemplary block configuration of the image capturing apparatus 830. The block configuration shown here aims to describe the optical characteristics of the image capturing apparatus 830, and therefore detailed descriptions of other configurations are omitted. The image capturing apparatus 830 includes an optical system 1010, a light receiving section 1020 that includes a plurality of light receiving elements that receive light passed through the optical system 1010, and an image generating section 1030 that generates a captured image of the subject from the light received by the light receiving section 1020.

The optical system 1010 has optical characteristics that hold an optical transfer function in relation to light from an object substantially constant over a range of a predetermined object distance along the optical axis. That is, the optical transfer function barely depends on the object distance. Such optical characteristics are realized by an aberration in the optical system 1010. For example, by using the optical system 1010, an imaging point of the light from an object point on the optical axis is widened to be in a range from z1 to z2 on the optical axis depending on the incident height at the lens surface of the optical system 1010. By using the optical system 1010 having the aberration described above, point spread of the light from the object point can be caused to be substantially independent from the position of the light receiving section 1020 if the light receiving section 1020 is within the range from z1 to z2.

By using the optical system 1010 described above, the range on the optical axis in which the point spread is uniform is lengthened, so that a position of the light receiving section 1020 is achieved at which the size of point image spread is nearly constant, regardless of the distance to the object point. By disposing the light receiving section 1020 at such a position, the optical transfer function of the light from the subject is held to be substantially constant over a predetermined range of object distance. Here, it is desirable that the point spread at least double the dot pitch of the light receiving section 1020. When the point spread is greater than or equal to double the dot pitch of the light receiving section 1020, the blurred subject image can be obtained. However, if the optical transfer function is substantially constant over the predetermined range of the object distance, a subject image of the subject that is present in the distance range can be reproduced into a sharp subject image by using the same reverse filtering. Accordingly, the blurred subject image can be reproduced into a sharp subject image through the image process by the reverse filtering according to the optical transfer function by the image adjusting section 910, as described above.

The image generating section 1030 generates the captured image based on the amount of light received by the light receiving elements included in the light receiving section 1020. At this time, it is desirable that the image generating section 1030 not perform a process that changes spatial frequency characteristics of the image, such as an edge enhancement process or the like. The captured image generated by the image generating section 1030 is stored in the recording medium 860 to be supplied to the image processing apparatus 810 or sent to the image processing apparatus 810 via the communication line 850. After this, in the image processing apparatus 810, the subject image is reproduced by an imaging process such as reverse filtering or the like by the image adjusting section 910, as described above.

Figure 4:
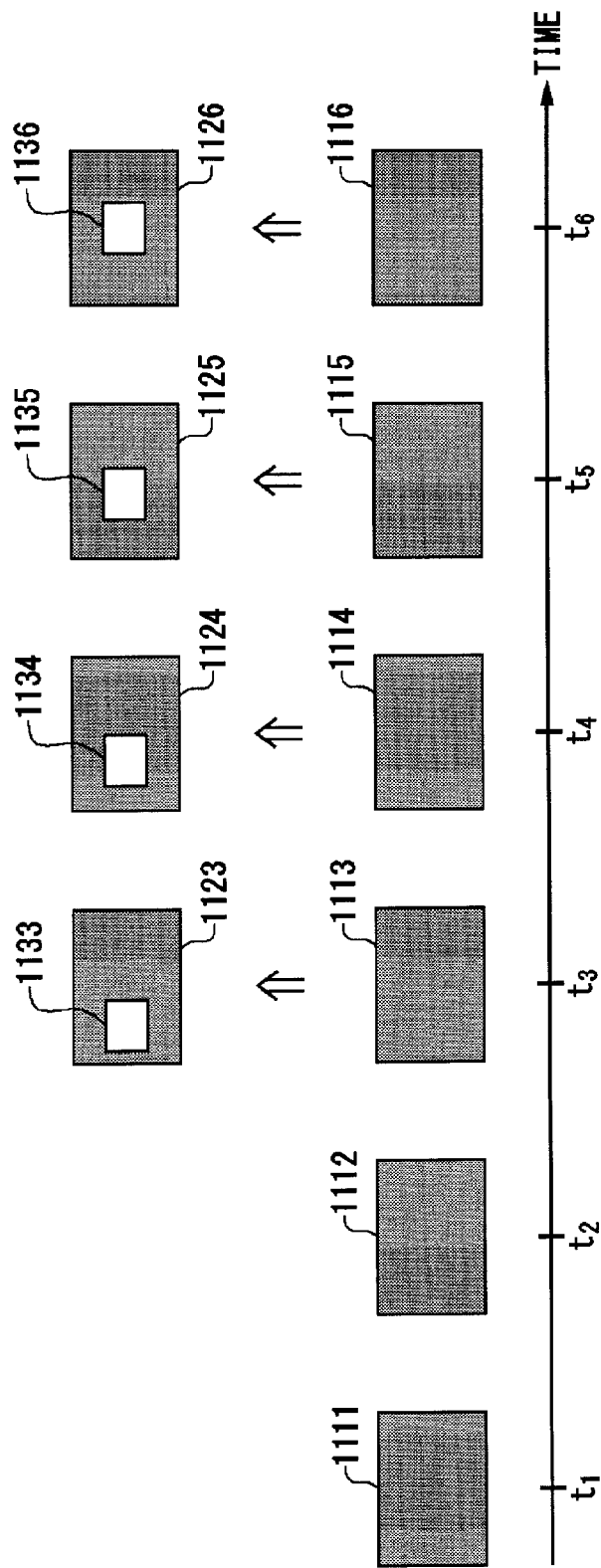
FIG. 4 shows an example of an output motion image that is output from an image output section 990.

FIG. 4 shows an example of an output motion image that is output from the image output section 990. The original image acquiring section 930 acquires the frame images 1111-1116 included in the motion image captured by the image capturing apparatus 830. The characteristic region judging section 960 makes a judgment that a moving object is not present in frame image 1111 and frame image 1112. Furthermore, the characteristic region judging section 960 makes a judgment that a moving object is present in frame images 1113-1116. The characteristic region identifying section 970 identifies moving object regions 1133, 1134, 1135, 1136 in the frame images 1113-1116 based on the motion vectors included in the motion image. The image adjusting section 910 generates reproduced images 1123-1126 by reproducing through reverse filtering or the like the images of the moving object regions 1133, 1134, 1135, 1136 in the frame images 1113-1116.

The image output section 990 outputs a motion image that successively plays the frame image 1111, the frame image 1112, the reproduced image 1123, the reproduced image 1124, the reproduced image 1125, and the reproduced image 1126. Because the image adjusting section 910 need reproduce only the image of the moving object region to generate the reproduced image 1123, the reproduced image 1124, the reproduced image 1125, and the reproduced image 1126, the time necessary for the reproduction process is decreased in comparison to a case where the entire image is reproduced.

Therefore, the image output section 990 can quickly output the motion image. Furthermore, because the motion image output from the image output section 990 includes the characteristic region of the moving object or the like in high image quality, an observer of the motion image can clearly see the characteristic region.

Figure 5:
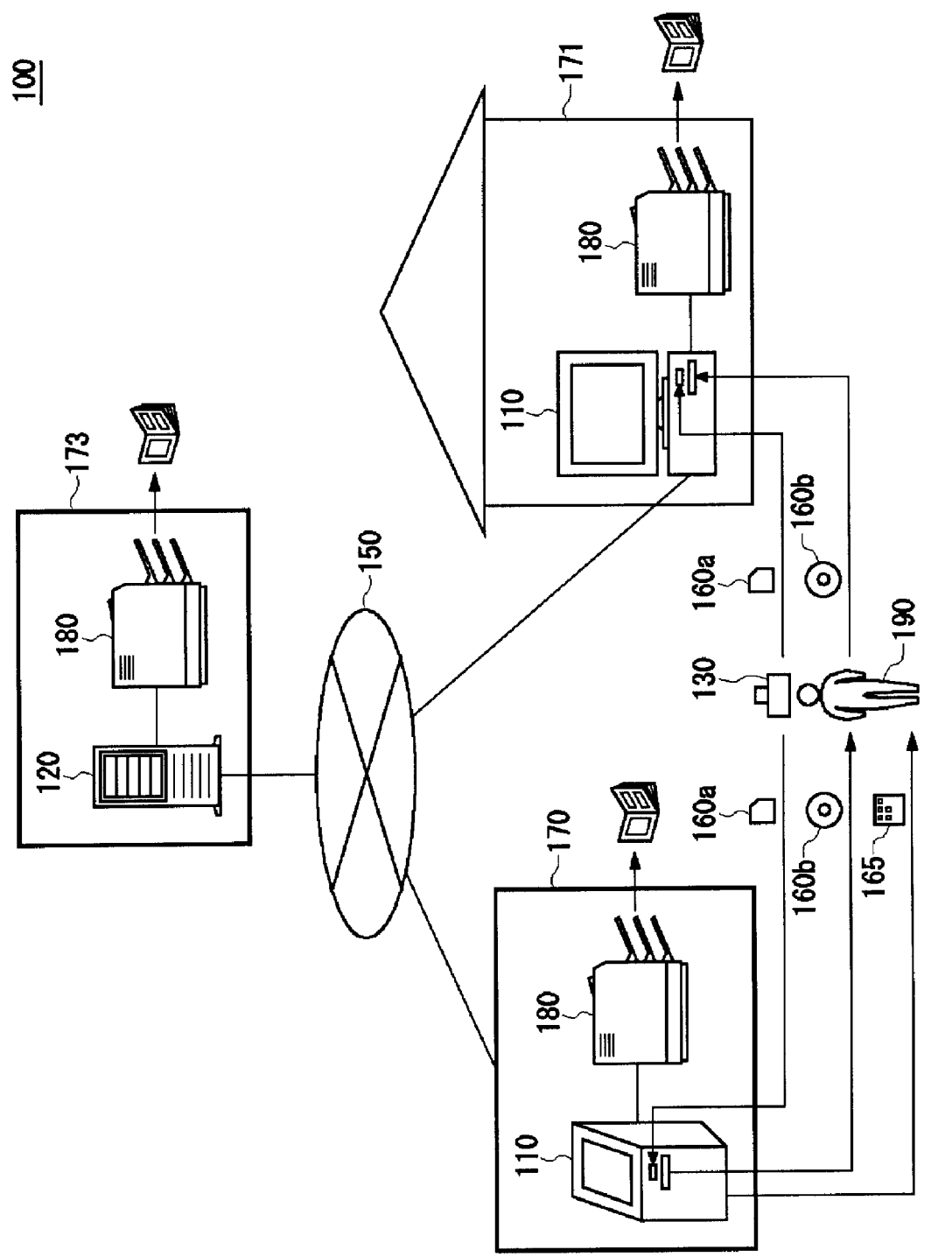
FIG. 5 shows an example of an environment in which to use an image managing system 100.

FIG. 5 shows an example of an environment in which to use an image managing system 100 according to another embodiment of the present invention. The image managing system 100 is provided with an image capturing apparatus 130, an image managing apparatus 110, and an order server 120. The image managing apparatus 110 is disposed at a shop 170 such as a photography store or a convenience store or at a home 171 of a user 190 or the like. The image managing apparatus 110 receives the captured image generated by the image capturing apparatus 130, enlarges a characteristic portion of the image such as a face of a person, an eye of a person, or the like included in the reproduced image of the captured image based on the optical characteristics of the image capturing apparatus 130, displays the image of the enlarged portion to the user 190 along with the captured image, and receives a print order from the user 190. The image managing apparatus 110 may be an information terminal such as a personal computer or a kiosk terminal, for example.

More specifically, the image capturing apparatus 130 captures an image of a subject through a phase mask that holds an optical transfer function substantially constant over a range of a predetermined object distance along the optical axis, and also records in a recording medium 160*a* the obtained captured image and an apparatus ID that identifies the image capturing apparatus 130. The optical system included in the image capturing apparatus 130 has optical characteristics that blur the light from the subject by adjusting the light. The captured image captured by the image capturing apparatus 130 is blurred, but the focal depth is increased. The image capturing apparatus 130 may include an optical system that has optical characteristics identical to those of the optical system 1010 included in the image capturing apparatus 830. The image managing apparatus 110 reads the captured image from the recording medium 160*a* and generates a thumbnail image of the captured image. Furthermore, the image managing apparatus 110 applies the reproduction process to the captured image read from the recording medium 160*a* corresponding to the optical transfer function of the image capturing apparatus 130 identified by the apparatus ID to generate the reproduced image. The image managing apparatus 110 records in the recording medium 160*b*, along with the captured image and the thumbnail image, the enlarged image obtained by enlarging the characteristic portion of the face of the person, the eye of the person, or the like included in the reproduced image.

When the user 190 orders the print, the image managing apparatus 110 displays in a display screen the thumbnail image and the enlarged image read from the recording medium 160*b* that correspond to the order received from the user 190. The user 190 confirms the enlarged image displayed together with the thumbnail image and selects the captured image to order prints thereof from the image managing apparatus 110. The image managing apparatus 110 sends a print order that includes the reproduced image obtained by reproducing the captured image selected by the user 190 to the order server 120 via a communication line 150. The order server 120 prints out the reproduced image from the output apparatus 180, such as a printer, in response to the print order, thereby providing the printed reproduced image to the user 190. The user 190 may look at the enlarged image and provide instructions to the image managing apparatus 110 concerning whether to apply the reproduction process and the strength of the reproduction process. The image managing apparatus 110 may then generate the reproduced image by applying to the captured image the reproduction process having a strength according to the instructions from the user 190. Alternatively, the image managing apparatus 110 may create an image order sheet 165 in which the enlarged image can be printed along with the captured image or the thumbnail image of the captured image and provide the image order sheet 165 to the user 190.

By using the image managing system 100 or the image order sheet 165 provided from the image managing system 100 described above, the user 190 can effectively judge whether there is red-eye, whether an expression of a person is captured well, whether a reproduction process should be performed, whether the reproduced image is suitable for a print, or the like by checking the enlarged image. Furthermore, because the image managing apparatus 110 displays the thumbnail image and the enlarged image stored in the recording medium 160*a* on the display screen during the ordering, the order screen can be displayed more quickly than in a case where the captured image itself is read and displayed.

The image capturing apparatus 130 may store the enlarged image of the characteristic portion in the recording medium 160*a* along with the captured image. The image managing apparatus 110 may apply the reproduction process to the enlarged image read from the recording medium 160*a* and display the captured image and the reproduced enlarged image in the display screen. The output apparatus 180 may be disposed in the shop 170 or the home 171 and connected to the image managing apparatus 110 in a manner to allow communication therebetween, and may provide the reproduced image to the user 190 by printing the reproduced image in response to the print order from the image managing apparatus 110. Alternatively, the output apparatus 180 may receive printing data of the image order sheet 165 from the image managing apparatus 110 and print the image order sheet 165. The image managing apparatus 110 may record the reproduced image in the recording medium 160 and send to the order server 120 the print order that includes the reproduced image, which is obtained by reproducing the captured image designated by the user 190, in the recording medium 160. Alternatively, an image reproducing apparatus that is different from the image managing apparatus 110 may generate the reproduced image. The image managing apparatus 110 may send the print order that includes the apparatus ID and the captured image to the order server 120, and the image reproducing apparatus may generate the reproduced image by reproducing the captured image according to the optical characteristics of the image capturing apparatus 130 identified by the apparatus ID included in the print order. The order server 120 may receive the reproduced image and print the reproduced image.

Figure 6:
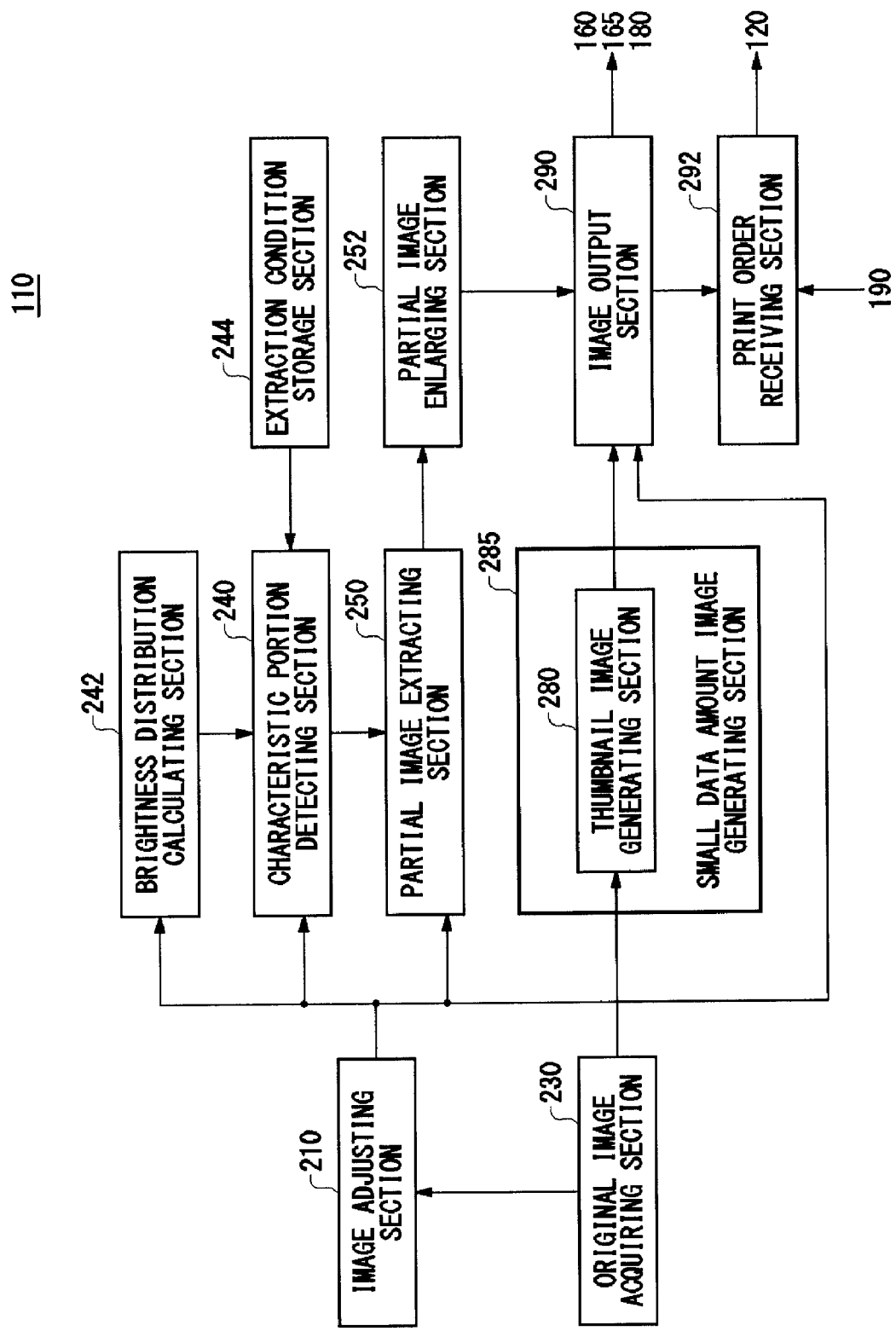
FIG. 6 shows an exemplary block configuration of an image managing apparatus 110.

FIG. 6 shows an exemplary block configuration of the image managing apparatus 110. The image managing apparatus 110 is provided with an image adjusting section 210, an original image acquiring section 230, a characteristic portion detecting section 240, a brightness distribution calculating section 242, an extraction condition storage section 244, a partial image extracting section 250, a partial image enlarging section 252, a small data amount image generating section 285, an image output section 290, and a print order receiving section 292. The thumbnail image generating section 280 includes a small data amount image generating section 285. The image managing apparatus 110 of the present embodiment functions as an apparatus that records the enlarged image and the thumbnail image in the recording medium 160b, an apparatus that creates an order sheet by reading the enlarged image and the thumbnail image from the recording medium 160b, and an apparatus that reads the enlarged image and the thumbnail image from the recording medium 160b and receives an order from the user 190. In the following description, the recording medium 160a and the recording medium 160b are referred to collectively as "the recording media 160."

The original image acquiring section 230 acquires the original image and information that indicates the optical characteristics of the image capturing apparatus 130 that captured the original image in association with each other. More specifically, the original image acquiring section 230 acquires as the original image the captured image captured by the image capturing apparatus 130 and the apparatus ID that are recorded in the recording medium 160 by reading the captured image and the apparatus ID from the recording medium 160. The small data amount image generating section 285 generates a small data amount image by decreasing the data amount of the original image acquired by the original image acquiring section 230. More specifically, the thumbnail image generating section 280 generates the thumbnail image of the original image acquired by the original image acquiring section 230. The image adjusting section 210 adjusts the original image acquired by the original image acquiring section 230 based on the optical characteristics indicated by the information acquired by the original image acquiring section 230 in association with the original image. Alternatively, the original image acquiring section 230 may acquire the original image captured by the image capturing apparatus 130, in which the optical transfer function is held substantially constant over a range of a predetermined object distance along the optical axis, in association with the information that indicates the same optical transfer function. The image adjusting section 210 then adjusts the original image acquired by the original image acquiring section 230 based on the optical transfer function indicated by the information acquired by the original image acquiring section 230. Here, the apparatus ID is given as an example of the information that indicates the optical transfer function.

The extraction condition storage section 244 stores in advance an extraction condition for a partial image extracted by the partial image extracting section 250. For example, the extraction condition storage section 244 may store a characteristic outline pattern of the subject. For example, the extraction condition storage section 244 may store as the extraction condition a pattern of a subject to be a main subject (e.g., a shape pattern, a brightness pattern, a color pattern, or the like of a person, a face of a person, an eye of a person, an animal, or the like). As another example, the extraction condition storage section 244 may store as the extraction condition instructions to extract a subject included at a position in the center of the image. Alternatively, the extraction condition storage section 244 may store as the extraction condition a reference proportion of pixels having a minimum brightness value and pixels having a maximum brightness value in a brightness frequency distribution in the captured image. As yet another example, the extraction condition storage section 244 may store as the extraction condition a reference value of a frequency component serving as a reference proportion to be included in a high frequency component that is higher than a prescribed frequency component in the captured image.

The characteristic portion detecting section 240 detects a portion of the image that matches the extraction condition stored in the extraction condition storage section 244 from the image obtained through the adjustment by the image adjusting section 210 (hereinafter, this image is sometimes referred to simply as the reproduced image). The partial image extracting section 250 extracts the partial image that includes the characteristic portion from the image obtained through the adjustment by the image adjusting section 210. Here, the partial image extracting section 250 may extract a plurality of partial images from the original image.

The partial image enlarging section 252 enlarges the partial image extracted by the partial image extracting section 250. The image output section 290 outputs the partial image enlarged by the partial image enlarging section 252 along with the small data amount image generated by the small data amount image generating section 285. More specifically, the image output section 290 outputs the partial image enlarged by the partial image enlarging section 252 along with the thumbnail image generated by the thumbnail image generating section 280. In this manner, the image managing apparatus 110 detects the characteristic portion in the reproduced image using the characteristic portion detecting section 240, enlarges the image that includes the characteristic portion, and displays the enlarged image to the user 190 along with the associated thumbnail. Accordingly, the user 190 can order the print after determining whether the captured image is suitable for printing by the image managing apparatus 110.

As another example, the characteristic portion detecting section 240 detects the main subject of the image obtained through the adjustment by the image adjusting section 210 based on the outline of the subject included in the reproduced image and pattern matching or the like of the main subject pattern stored in the extraction condition storage section 244. The partial image extracting section 250 extracts the partial image that includes the main subject in the image obtained through the adjustment by the image adjusting section 210.

As another example, the characteristic portion detecting section 240 detects a person in the image obtained through the adjustment by the image adjusting section 210 based on the outline of the subject included in the reproduced image and pattern matching or the like of the person pattern stored in the extraction condition storage section 244. The partial image extracting section 250 extracts the partial image that includes the person in the image obtained through the adjustment by the image adjusting section 210.

As another example, the characteristic portion detecting section 240 detects the face of a person in the image obtained through the adjustment by the image adjusting section 210 based on the outline of the subject included in the reproduced image and pattern matching or the like of the person face pattern stored in the extraction condition storage section 244. The partial image extracting section 250 extracts the partial image that includes the face of the person in the image obtained through the adjustment by the image adjusting section 210.

As another example, characteristic portion detecting section 240 detects the eye of a person in the image obtained through the adjustment by the image adjusting section 210 based on the outline of the subject included in the reproduced image and pattern matching or the like of the person eye pattern stored in the extraction condition storage section 244. The partial image extracting section 250 extracts the partial image that includes the eye of the person in the image obtained through the adjustment by the image adjusting section 210.

As another example, the brightness distribution calculating section 242 calculates a brightness distribution in the image obtained through the adjustment by the image adjusting section 210. The characteristic portion detecting section 240 detects a portion in which the density of pixels having the maximum brightness or the density of pixels having the minimum brightness is high in the image obtained through the adjustment by the image adjusting section 210 based on a calculation result from the brightness distribution calculating section 242. More specifically, the characteristic portion detecting section 240 detects, as the portion in which the density of pixels having the maximum brightness or the density pixels having the minimum brightness is high in the original image, a portion in which the proportion of the number of pixels included in a minimum brightness value and the number of pixels included in a maximum brightness value in the brightness distribution calculated by the brightness distribution calculating section 242 is greater than a reference proportion of the minimum brightness value and the maximum brightness value stored in the extraction condition storage section 244. The partial image extracting section 250 extracts the partial image of the portion in which the density of the pixels having the maximum brightness and the pixels having the minimum brightness is high in the image obtained through the adjustment by the image adjusting section 210.

The original image acquiring section 230 may acquire the plurality of original images and information that indicates the optical characteristics of each image capturing apparatus that captured each of the plurality of original images in association with each other. In such a case, the thumbnail image generating section 280 generates a thumbnail image of each of the plurality of original images acquired by the original image acquiring section 230. The image adjusting section 210 adjusts each of the plurality of original images acquired by the original image acquiring section 230 based on the optical characteristics indicated by the information acquired by the original image acquiring section 230 in association with each of the plurality of original images. The characteristic portion detecting section 240 detects the characteristic portion in each of the plurality of images obtained through the adjustment of each of the plurality of original images by the image adjusting section 210. The partial image extracting section 250 extracts the partial image that includes the characteristic portion from each of the plurality of images obtained through the adjustment of each of the plurality of original images by the image adjusting section 210. The partial image enlarging section 252 enlarges the plurality of partial images extracted by the partial image extracting section 250. The image output section 290 outputs each of the plurality of partial images enlarged by the partial image enlarging section 252 along with each of the plurality of thumbnail images generated by the thumbnail image generating section 280.

The image output section 290 displays the order sheet in which each of the plurality of partial images enlarged by the partial image enlarging section 252 is displayed in close proximity to each of the plurality of thumbnail images generated by the thumbnail image generating section 280. The print order receiving section 292 receives the order for printing of the reproduced images corresponding to the plurality of thumbnail images output by the image output section 290. Therefore, the user 190 can check whether the thumbnail images displayed in the display screen of the image managing apparatus 110 have red-eye by looking at the enlarged images, even when the thumbnail images are too small to check for the presence of red-eye. Accordingly, the user 190 can easily select the reproduced images that are suitable for printing from the order screen of the image managing apparatus 110 in which many images are displayed.

The image output section 290 records each of the plurality of thumbnail images generated by the thumbnail image generating section 280 and each of the plurality of partial images enlarged by the partial image enlarging section 252 to be output in association with each other by outputting the partial images and the thumbnail images to the recording medium 160 to be recorded therein. More specifically, the image managing apparatus 110 records in the recording medium 160 an image correspondence file in which is written the corresponding relationship between a file name of a thumbnail image stored in the recording medium 160 and a file name of an enlarged image, also stored in the recording medium 160, of the reproduced image indicated by the thumbnail image.

The image output section 290 prints the image order sheet 165 in which each of the plurality of partial images enlarged by the partial image enlarging section 252 are printed in close proximity to each of the plurality of thumbnail images generated by the thumbnail image generating section 280. For example, the image output section 290 causes the output apparatus 180 to print the image order sheet 165 by sending the print data of the image order sheet 165 to the output apparatus 180. More specifically, the entire original image is printed in the entire image printing section of the image order sheet 165. The partial image that includes the characteristic portion in the reproduced image (the image obtained through adjustment of the original image based on the optical characteristics of the image capturing apparatus 130 that captured the original image) is enlarged and the thus enlarged image is printed in the partial image printing section of the image order sheet 165. The entire image printing section and the partial image printing section are printed next to each other in the image order sheet 165. Alternatively, a plurality of entire image printing sections in which the plurality of entire original images are printed and a plurality of partial image printing sections in which the partial images that include the characteristic portions in the reproduced image are enlarged may be printed next to each other in the image order sheet 165. Furthermore, a command for ordering the reproduced image may be entered into an entire image order entry section of the image order sheet 165, which is disposed adjacent to the entire image printing section.

Figure 7:
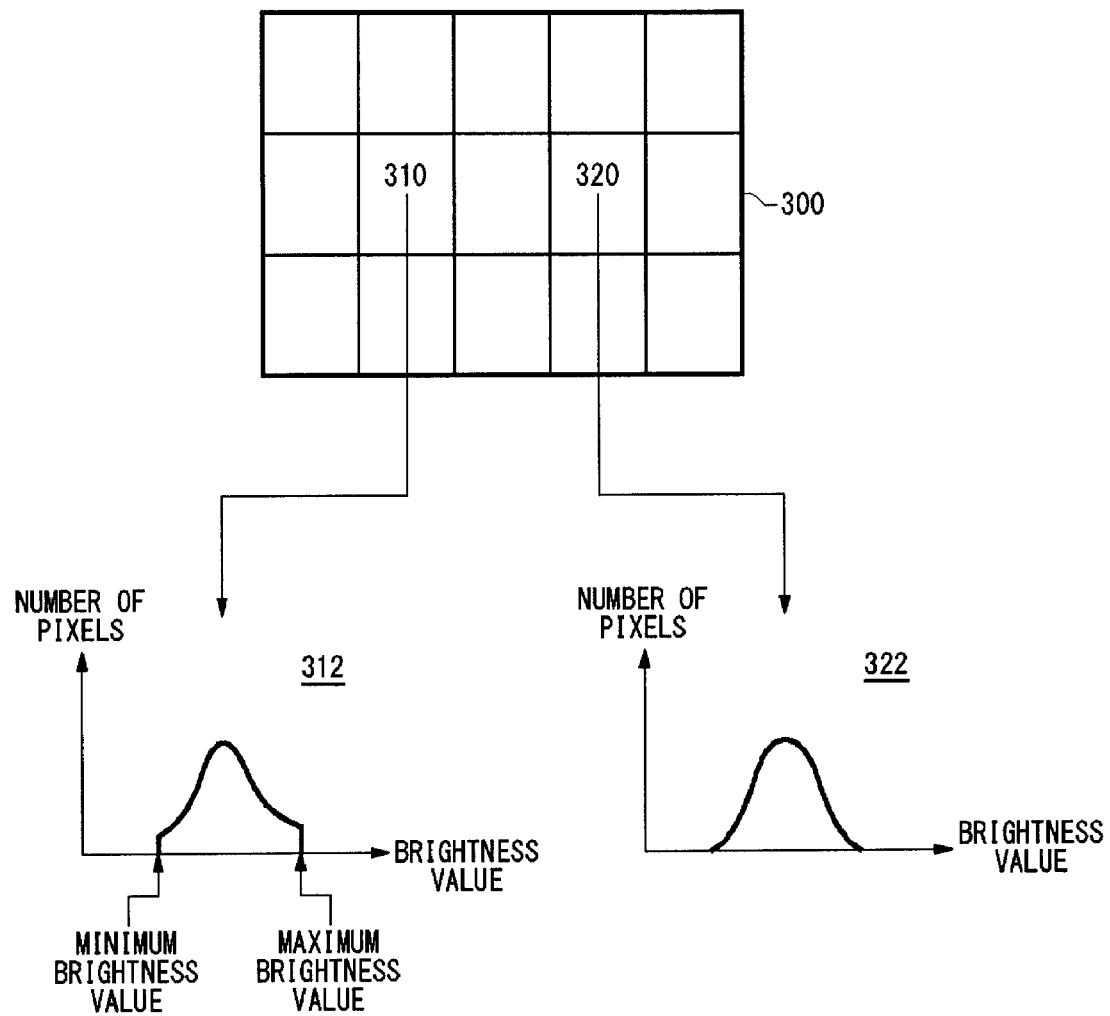
FIG. 7 shows an example of a method for detecting and extracting a characteristic portion performed by a characteristic portion detecting section 240.

FIG. 7 shows an example of a method for detecting and extracting a characteristic portion performed by the characteristic portion detecting section 240. The brightness distribution calculating section 242 calculates a brightness distribution of a partial region obtained by dividing a captured image 300 (in the example of FIG. 7, the brightness distribution is calculated for each of 15 partial regions in a 3×5 arrangement). In FIG. 7, brightness distributions 312, 322 calculated by the brightness distribution calculating section 242 for partial regions 310, 320 are shown as examples. Here, the brightness distribution may be a frequency distribution of brightness values that indicates a distribution of pixels having certain brightness values. The brightness values may include a brightness value for each color component.

The characteristic portion detecting section 240 calculates the proportion of pixels having the minimum brightness value or the maximum brightness value to the number of pixels in the entire image. The characteristic portion detecting section 240 detects a partial region in which the calculated proportion is greater than a predetermined proportion as the portion in which the density of pixels having the minimum brightness or the maximum brightness is high. In the example of FIG. 7, the proportion of pixels having the minimum brightness value or the maximum brightness value in the brightness distribution 312 is greater than the proportion of pixels having the minimum brightness value or the maximum brightness value in the brightness distribution 322, and therefore the partial region 320 preferentially selects the partial region 310 as the characteristic portion.

A brightness distribution having a shape in which the ends of the frequency distribution are cut, such as the brightness distribution 312, is obtained when a subject having a brightness range that exceeds the dynamic range of the image capturing apparatus is present. In other words, the partial region 312 is a region that has a high possibility of not being expressed with sufficient contrast. Because the image managing apparatus 110 can extract such a region as the characteristic region, enlarge the extracted image, and display the enlarged image to the user 190, the user 190 can order the reproduced image after checking whether the contrast thereof can be sufficiently expressed.

Figure 8:
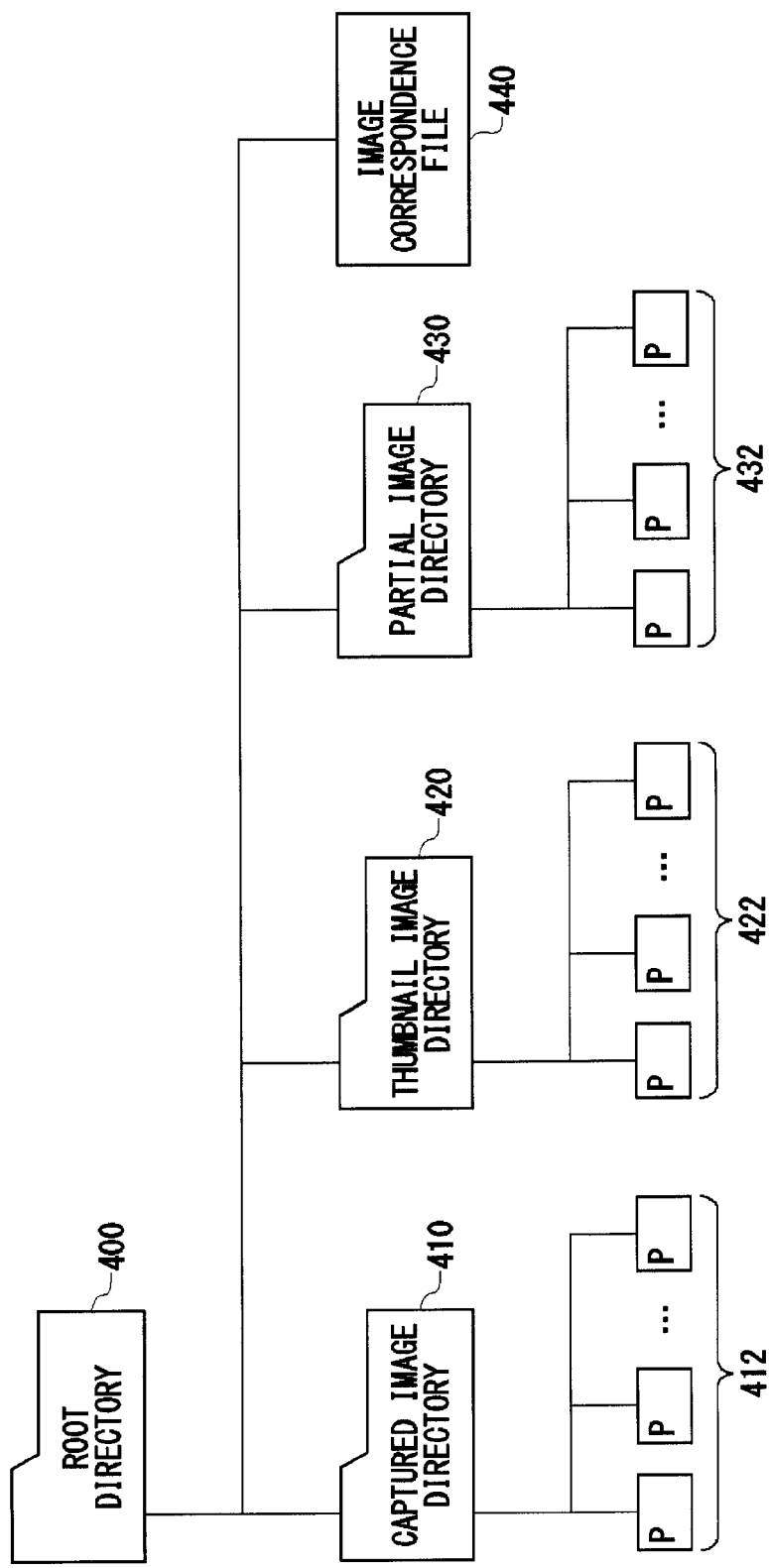
FIG. 8 shows an exemplary arrangement of files recorded in a recording medium 160$b$ by an image output section 290.

FIG. 8 shows an exemplary arrangement of files recorded in the recording medium 160b by the image output section 290. The image output section 290 arranges a captured image directory 410, a thumbnail image directory 420, a partial image directory 430, and an image correspondence file 440 in a root directory 400. The image output section 290 arranges a plurality of captured image files 412 received from the recording medium 160a in the captured image directory 410. Furthermore, the image output section 290 arranges a plurality of thumbnail image files 422, which are each of the thumbnail images of the captured image, in the thumbnail image directory 420. Yet further, the image output section 290 arranges a plurality of partial image files 432 generated through the enlargement by the partial image enlarging section 252 in the partial image directory 430.

The image output section 290 records in the root directory an image correspondence file 440 in which is written the corresponding relationship between the captured image files 412, the thumbnail image files 422, and the partial image files 432. More specifically, the image output section 290 records in the image correspondence file 440 the file names of the captured image files 412, the thumbnail image files 422, and the partial image files 432 in association with each other. Here, the apparatus ID of the image capturing apparatus 130 that captured the captured image is also recorded in the image correspondence file 440. Furthermore, the image output section 290 stores in the image correspondence file 440 file names that include the path name of each file. The image output section 290 may record the contents of the image correspondence file 440 in an XML format. For example, the image output section 290 may generate the image correspondence file 440 in which is written the file names of the captured image files 412, the thumbnail image files 422, and the partial image files 432, each having an associated tag indicating that the associated file is a captured image file, a thumbnail image file, or a partial image file.

The image output section 290 may also store in the image correspondence file 440 information that indicates the order in which to display the thumbnail images or the captured images to be shown to the user 190 during the ordering of the print of the reproduced image or the like or information that indicates a position at which to display the thumbnail images or the captured images. By doing this, the image managing apparatus 110 can display the thumbnail images or the captured images at a position or in an order recorded in the image correspondence file 440 arranged in the root directory. Alternatively, the image output section 290 may record in the image correspondence file 440 an HTML file that designates the position at which to display the thumbnail images or the captured images on the screen during the print ordering or the like. For example, the image output section 290 stores in the recording medium 160 an HTML file that designates the order screen to be displayed during the ordering. Therefore, the user 190 can check the captured image and the enlarged image on any image managing apparatus 110 that runs a WEB browser, regardless of the type of terminal, such as a personal computer, a cellular phone, a PDA, or the like. The image correspondence file 440 may be the aforementioned HTML file.

The captured image files 412, the thumbnail image files 422, the partial image files 432, and the image correspondence files 440 are not limited to the directory configuration shown in the example of FIG. 7, and may be arranged in a variety of directory configurations. The image output section 290 may arrange the image correspondence file 440 in a directory (the root directory 400 in the example of FIG. 7) that is designated for an image managing apparatus 110 from among a plurality of various types of image managing apparatuses 110. In such a case, the position of each of the captured image files 412, the thumbnail image files 422, and the partial image files 432 can be identified by reading the image correspondence file 440 in the designated directory, even when the files are arranged in a directory configuration that is different for each image managing apparatus 110.

As described above, the image managing apparatus 110 stores in the recording medium 160 the image correspondence file 440 in which each thumbnail image file and each partial image file are associated with each other. Accordingly, the image managing apparatus 110 can quickly display the order screen by reading the image correspondence file 440 recorded in the recording medium 160 by another image managing apparatus 110.

Figure 9:
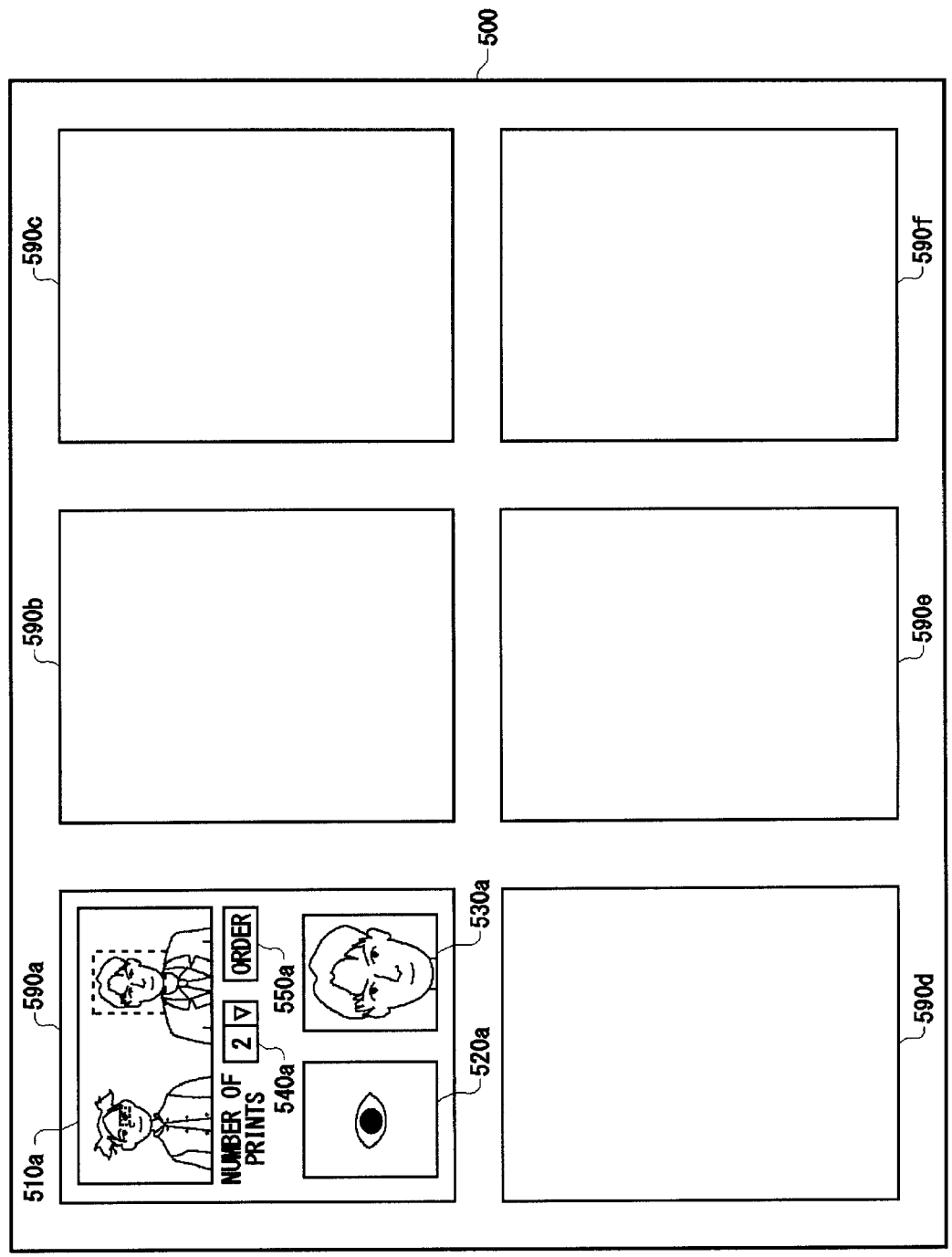
FIG. 9 shows an example of an order screen 500 used when the image managing apparatus 110 receives an order for a captured image.

FIG. 9 shows an example of an order screen 500 used when the image managing apparatus 110 receives an order for the captured image. The image managing apparatus 110 displays in the order screen 500 a plurality of orderable image sections 590a-f of a single captured image ordered by the user 190. The orderable image sections 590a-f include as display elements each of the entire image display regions 510a-f, partial image display regions 520a-f, 530a-f, print number selecting buttons 540a-f, and order buttons 550a-f. The letters "a-f" are added to the end of the reference numeral of each display element included in the orderable image sections 590a-f in order to identify which of the orderable image sections 590a-f the display element is in.

The image managing apparatus 110 reads from the recording medium 160 the files indicated by the file names that indicate the thumbnail images stored in the image correspondence file 440 and displays the read thumbnail images in the entire image display regions 510a-f. The image managing apparatus 110 reads from the recording medium 160 the files indicated by the file names that indicate the partial images and displays the read partial images in the partial image display regions 520a-f, 530a-f displayed at a position in the vicinity of each of the entire image display regions 510a-f. The image managing apparatus 110 may read from the recording medium 160 the files indicated by the file names that indicate the captured images and may display the read captured images in the entire image display regions 510a-f.

The print order receiving section 292 receives print order instructions to print the image in response to pressing of order buttons 550a-f along with instructions concerning the number of prints from the user 190 through the print number selecting buttons 540a-f displayed at positions associated with the entire image display regions 510a-f. The image managing apparatus 110 then stores in the memory, as the print order data, the file names of the captured image files 412 ordered by the print order, the file names of the partial image files 432 associated with the ordered captured images, and the number of prints ordered, in association with each other. When confirmation of the printing content is ordered through the order confirmation button 560, the print order receiving section 292 sequentially displays as a slide show the captured image files 412 indicated by the captured image file names stored in the memory and simultaneously displays the associated number of prints. When the print order is ordered through the order execution button 570, the print order receiving section 292 sends to the order server 120 the print order information that includes the content of the captured image files 412 stored in the memory, the apparatus ID of the image capturing apparatus 130 that captured the captured image files 412, and the number of prints of each image. It should be noted that the display screen 500 may be provided with a touch panel function, so that the print order receiving section 292 can receive the instructions that includes the print order and the number of prints according to the operation of the touch panel by the user 190.

Figure 10:
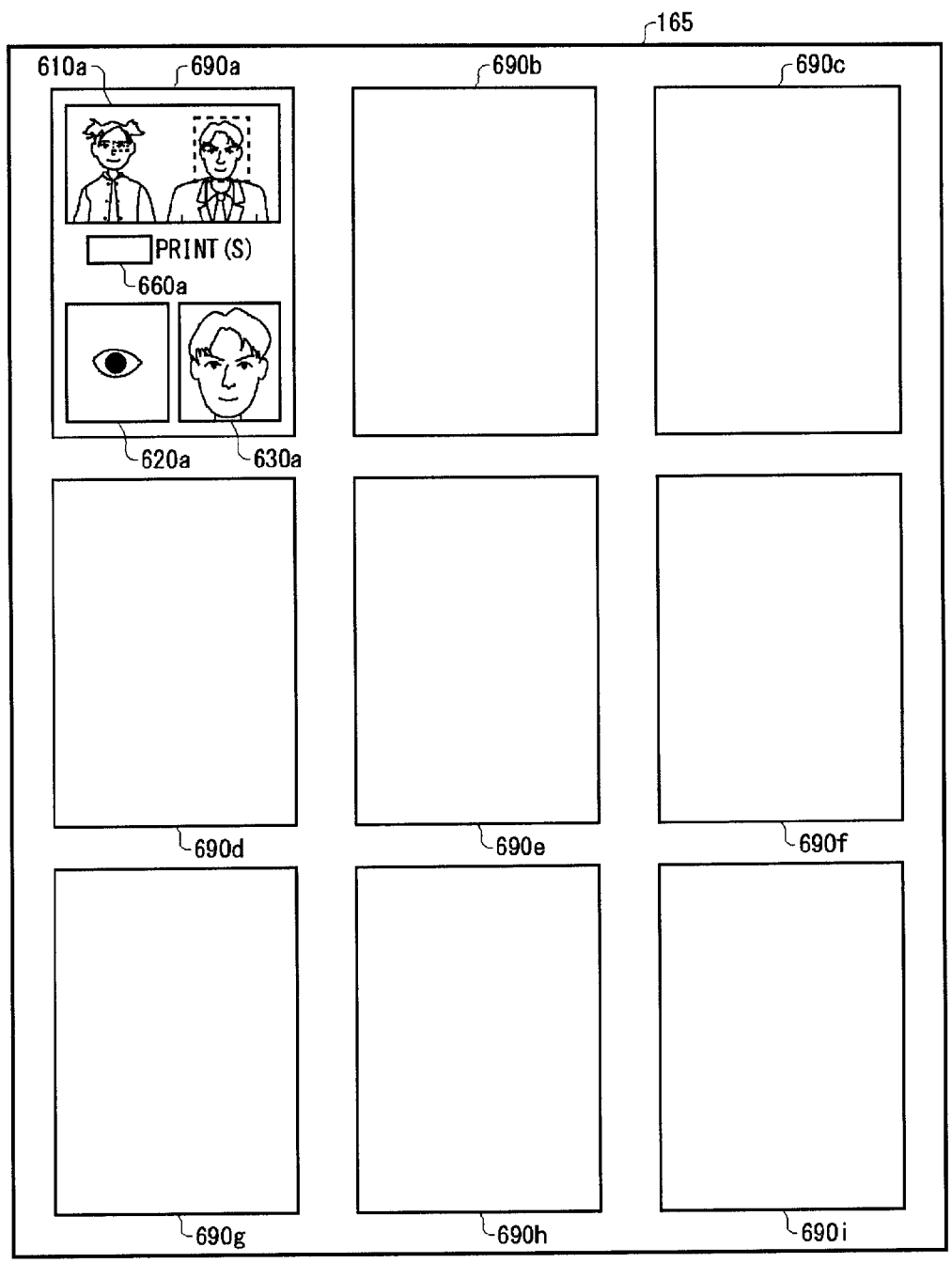
FIG. 10 shows an example of an image order sheet 165 printed by the image managing apparatus 110.

FIG. 10 shows an example of the image order sheet 165 printed by the image managing apparatus 110. The image managing apparatus 110 prints on the image order sheet 165 a plurality of orderable image printing sections 690a-i of a single captured image ordered by the user 190. The orderable image printing sections 690a-i include as printing elements each of entire image printing sections 610 (a-i, hereinafter referred to collectively as entire image printing sections 610), partial image printing sections 620 (a-i, hereinafter referred to collectively as partial image printing sections 620), partial image printing sections 630 (a-i, hereinafter referred to collectively as partial image printing sections 630), and entire image order entry sections 660 (a-i, hereinafter referred to collectively as entire image order entry sections 660). The letters "a-i" are added to the end of the reference numeral of each printing element included in the orderable image printing sections 690a-i to identify which of the orderable image printing sections 690a-i the printing element is in.

The image managing apparatus 110 reads from the recording medium 160 the files indicated by the file names that indicate the thumbnail images stored in the image correspondence file 440 and prints the read thumbnail images in the plurality of entire image printing sections 610. The image managing apparatus 110 reads from the recording medium 160 the files indicated by the file names that indicate the partial images and displays the read partial images in the plurality of partial image printing sections 620 and partial image printing sections 630 at positions in the vicinity of each of the entire image printing sections 610. The image managing apparatus 110 may read from the recording medium 160 the files indicated by the file names that indicate the captured images and display the read captured images in the entire image printing sections 610. Alternatively, the image managing apparatus 110 prints the entire image order entry sections 660a-i for ordering the images in the entire image printing section 610 adjacent to the entire image printing sections 610a-i. For example, the image managing apparatus 110 may print entire image order entry sections 660 that show a box in which the user 190 enters the number of prints of the captured image printed in the entire image printing section 610.

The size of the partial image printing sections 620 and the size of the partial image printing sections 630 may be different. The partial image printing sections 620 and the partial image printing sections 630 may be the same size as the entire image printing sections 610. Alternatively, the partial image printing sections 620 and the partial image printing sections 630 may be larger than the entire image printing sections 610.

Figure 11:
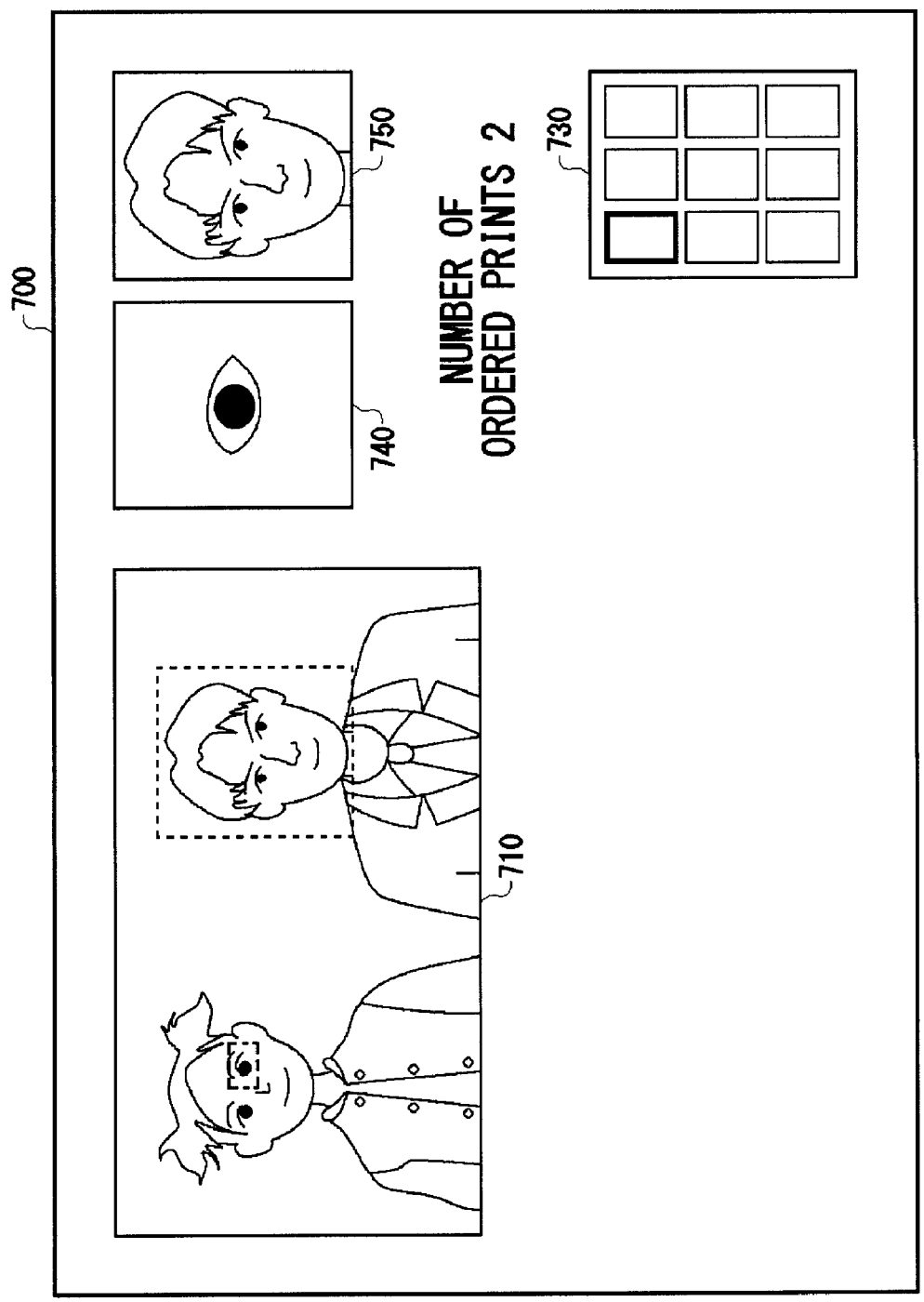
FIG. 11 shows an example of an order confirmation screen 700 used when the image managing apparatus 110 receives an order for the captured image.

FIG. 11 shows an example of an order confirmation screen 700 used when the image managing apparatus 110 receives an order for the captured image. The image managing apparatus 110 displays the order confirmation screen 700 that includes a confirmation screen region 710, partial image display regions 740, 750, and an order sheet region 730. More specifically, the image managing apparatus 110 sequentially displays as a slide show in the confirmation screen region 710 the captured images identified by the file names stored in the memory as the print order data.

At this time the image managing apparatus 110 displays the thumbnail images in the order sheet region 730 in a corner of the display screen 500 with a layout that is substantially the same as the layout of the captured image in the image order sheet 165. The image managing apparatus 110 displays in an enhanced manner the thumbnail image that indicates the captured image currently being displayed in the confirmation screen region 710. For example, the image managing apparatus 110 may display the thumbnail image indicating the captured image being shown in a manner to be larger than the other thumbnail images, display the image border of the thumbnail image indicating the captured image being shown in a manner to be thicker than the image borders of the other thumbnail images, display the thumbnail image indicating the captured image being shown in a manner to be brighter than the other thumbnail images, or the like. Through such a display, the user 190 can easily check which captured image to order by collating the captured images with the image order sheet 165.

The image managing apparatus 110 reads from the print order data stored in the memory the number of prints associated with the captured image being displayed in the confirmation screen region 710 and displays the number of prints in the vicinity of the confirmation screen region 710. The image managing apparatus 110 reads as the print order data the file indicated by the file name that indicates the partial images stored in the memory in association with the captured image displayed in the confirmation screen region 710 and displays the read partial images in the partial image display regions 740, 750.

Figure 12:
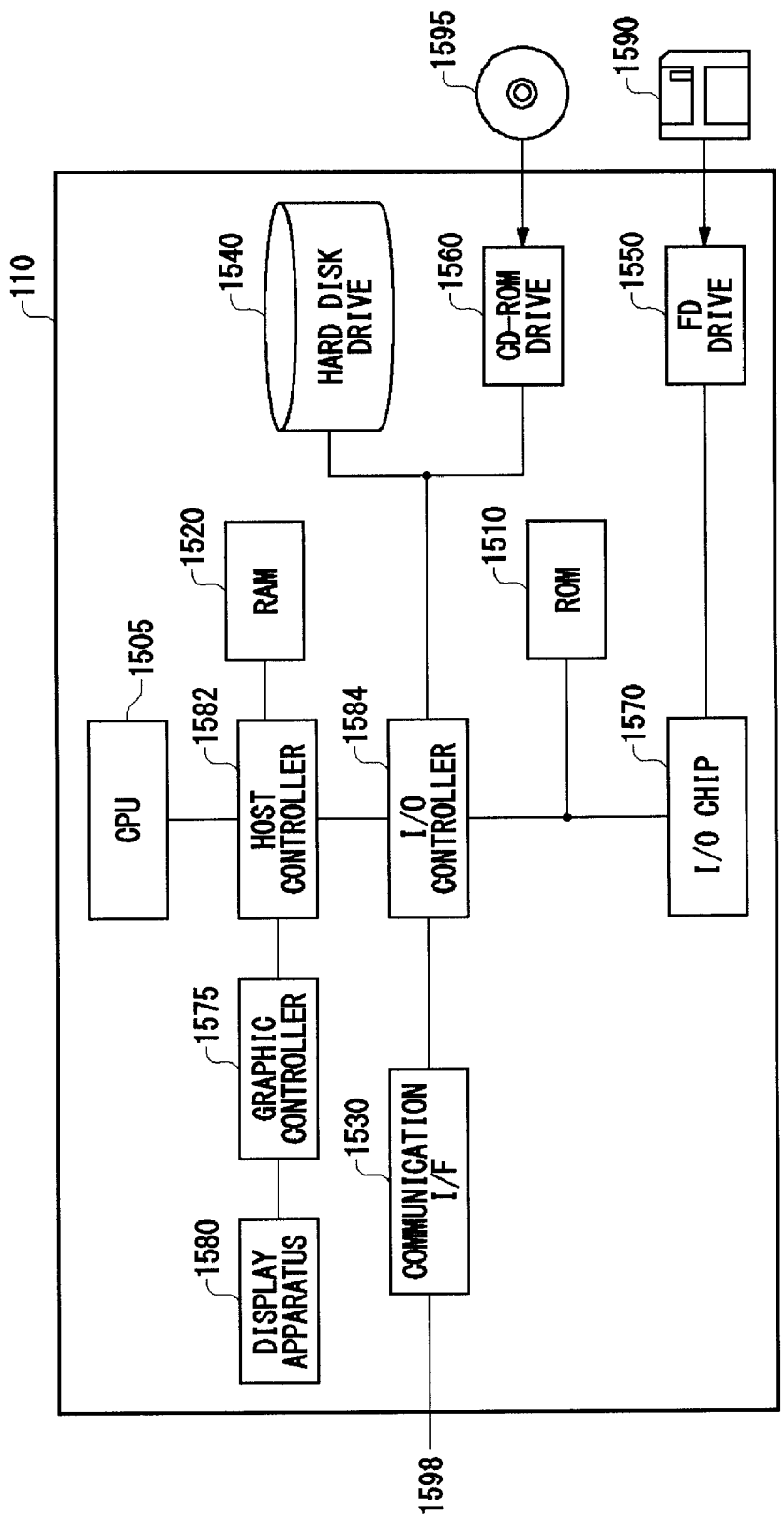
FIG. 12 shows an exemplary hardware configuration of the image managing apparatus 110 and the image processing apparatus 810.

FIG. 12 shows an exemplary hardware configuration of the image managing apparatus 110 and the image processing apparatus 810. The image processing apparatus 810 and the image managing apparatus 110 are provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and an input/output chip 1570, all of which are connected to the input/output controller 1584.

The host controller 1582 is connected to the RAM 1520 and is also connected to the CPU 1505 and graphic controller 1575 accessing the RAM 1520 at a high transfer rate. The CPU 1505 operates to control each section based on programs stored in the ROM 1510 and the RAM 1520. The graphic controller 1575 acquires image data generated by the CPU 1505 or the like on a frame buffer disposed inside the RAM 1520 and displays the image data in the display apparatus 1580. In addition, the graphic controller 1575 may internally include the frame buffer storing the image data generated by the CPU 1505 or the like.

The input/output controller 1584 connects the hard disk drive 1540, the communication interface 1530 serving as a relatively high speed input/output apparatus, and the CD-ROM drive 1560 to the host controller 1582. The hard disk drive 1540 stores the programs and data used by the CPU 1505. The communication interface 1530 is connected to a network communication apparatus 1598 and receives the programs or the data. The CD-ROM drive 1560 reads the programs and data from a CD-ROM 1595 and provides the read information to the hard disk drive 1540 and the communication interface 1530 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the image managing apparatus 110 and the image processing apparatus 810 start up, a program relying on the hardware of the image managing apparatus 110 and the image processing apparatus 810, and the like. The flexible disk drive 1550 reads programs or data from a flexible disk 1590 and supplies the read information to the hard disk drive 1540 and the communication interface 1530 via the RAM 1520. The input/output chip 1570 connects the flexible disk drive 1550 to each of the input/output apparatuses via, for example, a parallel port, a serial port, a keyboard port, a mouse port, or the like.

The programs performed by the CPU 1505 are stored on a recording medium such as the flexible disk 1590, the CD-ROM 1595, or an IC card and are provided by the user. The programs stored on the recording medium may be compressed or uncompressed. The programs are installed on the hard disk drive 1540 from the recording medium, are read by the RAM 1520, and are performed by the CPU 1505.

The programs performed by the CPU 1505 cause the image processing apparatus 810 to function as the original image acquiring section 930, the characteristic region judging section 960, the characteristic region identifying section 970, the image adjusting section 910, and the image output section 990 described in FIGS. 1 to 4. Furthermore, the programs performed by the CPU 1505 cause the image managing apparatus 110 to function as the image adjusting section 210, the original image acquiring section 230, the characteristic portion detecting section 240, the brightness distribution calculating section 242, the extraction condition storage section 244, the partial image extracting section 250, the partial image enlarging section 252, the small data amount image generating section 285, the image output section 290, and the print order receiving section 292 described in FIGS. 5 to 12.

The programs described above may be stored in an external storage medium. In addition to the flexible disk 1590 and the CD-ROM 1595, an optical recording medium such as a DVD or PD, a magnetooptical medium such as an MD, a tape medium, a semiconductor memory such as an IC card, or the like can be used as the recording medium. Furthermore, a storage apparatus such as a hard disk or a RAM disposed in a server system connected to the Internet or a specialized communication network may be used as the recording medium and the programs may be provided to the image processing apparatus 810 and the image managing apparatus 110 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image processing system, comprising:
    an image capturing apparatus that (i) has an optical system in which a size of point image spread is equal to or more than twice as a dot pitch and an optical transfer function is substantially constant over a predetermined object distance range on an optical axis and (ii) captures an original image, in which a subject image is blurred, by receiving light from the subject that passes through the optical system at a light receiving element; and
    an image processing apparatus that acquires, from the image capturing apparatus, the original image captured by the image capturing apparatus and a machine ID that identifies the image capturing apparatus, wherein
    the image capturing apparatus (i) generates the original image based on an amount of the light received at the light receiving element without performing an image processing that changes spatial frequency characteristics of an image including edge enhancement processing and (ii) provides the generated original image and the machine ID to the image apparatus and
    the image processing apparatus comprises:
        an original image acquiring section that acquires the original image from the image capturing apparatus;
        a characteristic region judging section that makes a judgment as to whether a characteristic region is present in the original image acquired by the original image acquiring section;
        an image adjusting section that, in a case where the characteristic region judging section makes a judgment that the characteristic region is present, reproduces an image of the characteristic region in the original image acquired by the original image acquiring section by applying reverse filtering according to the optical transfer function corresponding to the machine ID acquired from the image capturing apparatus; and
        an image output section that, in a case where the characteristic region judging section makes a judgment that the characteristic region is present, outputs, to an image display apparatus, an image in which the image of the characteristic region is reproduced by the image adjusting section and, in a case where the characteristic region judging section makes a judgment that the characteristic region is not present, outputs, to the image display apparatus, the original image acquired by the original image acquiring section.

2. The image processing system according to claim 1, wherein
    the image capturing apparatus captures a motion image including a plurality of original images,
    the original image acquiring section acquires the plurality of original images included in the motion image captured by the image capturing apparatus,
    the characteristic region judging section makes a judgment as to whether the characteristic region is present in each of the plurality of original images,
    the image adjusting section reproduces the image of the characteristic region in the original image in which the characteristic region is judged to be present by the characteristic region judging section by the reverse filtering, and
    the image output section outputs, to the image display apparatus, the image in which the image of the characteristic region is reproduced by the image adjusting section of the original image in which the characteristic region is judged to be present by the characteristic region judging section and also outputs, to the image display apparatus, the original image in which the characteristic region is judged to not be present by the characteristic region judging section.

3. The image processing system according to claim 2, wherein the characteristic region judging section makes a judgment as to whether the characteristic region is present in each of the plurality of original images based on a motion vector included in the motion image.

4. The image processing system according to claim 3, wherein
the characteristic region judging section makes a judgment as to whether a moving object is present in each of the plurality of original images based on the motion vector included in the motion image, and
the image adjusting section reproduces the image of the region in which the moving object is present in the original image in which the moving object is judged to be present by the characteristic region judging section by the reverse filtering.

5. The image processing system according to claim 3, wherein
the characteristic region judging section makes a judgment as to whether a region changing over time is present in each of the plurality of original images based on the motion vector included in the motion image, and
the image adjusting section reproduces the image of the region changing over time in the original image in which the region changing over time is judged to be present by the characteristic region judging section by the reverse filtering.

6. The image processing system according to claim 1, wherein the characteristic region judging section makes a judgment as to whether the characteristic region is present in the original image based on a color included in the original image.

7. An image processing method for processing an image using an image processing system, the image processing system comprising:
an image capturing apparatus that (i) has an optical system in which a size of point image spread is equal to or more than twice as a dot pitch and an optical transfer function is substantially constant over a predetermined object distance range on an optical axis and (ii) captures an original image, in which a subject image is blurred, by receiving light from the subject that passes through the optical system at a light receiving element; and
an image processing apparatus that acquires, from the image capturing apparatus, the original image captured by the image capturing apparatus and a machine ID that identifies the image capturing apparatus, wherein
the image capturing apparatus (i) generates the original image based on an amount of the light received at the light receiving element without performing an image processing that changes spatial frequency characteristics of an image including edge enhancement processing and (ii) provides the generated original image and the machine ID to the image processing apparatus,
wherein the image processing method comprises:
acquiring the original image from the image capturing apparatus;
making a judgment as to whether a characteristic region is present in the original image acquired at the original image acquiring step;
reproducing an image of the characteristic region in the original image acquired at the original image acquiring step by applying reverse filtering according to the optical transfer function corresponding to the machine ID acquired from the image capturing apparatus when a judgment is made at the characteristic region judging step that the characteristic region is present; and
outputting, to an image display apparatus, an image in which the image of the characteristic region is reproduced, at the image adjusting step in a case where a judgment is made at the characteristic region judging step that the characteristic region is present and outputting, to the image display apparatus, the original image acquired at the original image acquiring step in a case where a judgment is made at the characteristic region judging step that the characteristic region is not present.

8. A computer program product used by an image processing systems, having computer instructions, recorded on a computer readable medium, for enabling a computer executing the computer instructions to cause the image processing system to function as:
an image capturing apparatus that (i) has an optical system in which a size of point image spread is equal to or more than twice as a dot pitch and an optical transfer function is substantially constant over a predetermined object distance range on an optical axis and (ii) captures an original image, in which a subject image is blurred, by receiving light from the subject that passes through the optical system at a light receiving element; and
an image processing apparatus that acquires, from the capturing apparatus, the original image captured by the image capturing apparatus and a machine ID that identifies the image capturing apparatus, wherein
the image capturing apparatus (i) generates the original image based on an amount of the light received at the light receiving element without performing an image processing that changes spatial frequency characteristics of an image including edge enhancement processing and (ii) provides the generated original image and the machine ID to the image processing apparatus and
the image processing apparatus comprises:
an original image acquiring section that acquires the original image from the image capturing apparatus;
a characteristic region judging section that makes a judgment as to whether a characteristic region is present in the original image acquired by the original image acquiring section;
an image adjusting section that, in a case where the characteristic region judging section makes a judgment that the characteristic region is present, reproduces an image of the characteristic region in the original image acquired by the original image acquiring section by applying reverse filtering according to the optical transfer function corresponding to the machine ID acquired from the image capturing apparatus; and
an image output section that, in a case where the characteristic region judging section makes a judgment that the characteristic region is present, outputs, to an image display apparatus, an image in which the image of the characteristic region is reproduced by the image adjusting section and, in a case where the characteristic region judging section makes a judgment that the characteristic region is not present, outputs, to the image display apparatus, the original image acquired by the original image acquiring section.

9. The image processing system according to claim 1, wherein the optical system has an aberration that widens an imaging point of light from an object on the optical axis to be in a predetermined range depending on an incident height at a lens surface of the optical system.

* * * * *